United States Patent
Hall et al.

(10) Patent No.: US 8,612,730 B2
(45) Date of Patent: Dec. 17, 2013

(54) HARDWARE ASSIST THREAD FOR DYNAMIC PERFORMANCE PROFILING

(75) Inventors: Ronald P. Hall, Cedar Park, TX (US); Venkat Rajeev Indukuru, Austin, TX (US); Alexander Erik Mericas, Austin, TX (US); Balaram Sinharoy, Poughkeepsie, NY (US); Zhong Liang Wang, Markham, CA (US)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 12/796,124

(22) Filed: Jun. 8, 2010

(65) Prior Publication Data

US 2011/0302395 A1 Dec. 8, 2011

(51) Int. Cl.
*G06F 9/00* (2006.01)
(52) U.S. Cl.
USPC .......................................................... 712/227
(58) Field of Classification Search
None
See application file for complete search history.

(56) References Cited

U.S. PATENT DOCUMENTS

| | | | |
|---|---|---|---|
| 6,842,898 B1 | 1/2005 | Carlson et al. | |
| 7,328,433 B2 | 2/2008 | Tian et al. | |
| 7,487,502 B2 | 2/2009 | Wang et al. | |
| 2005/0071841 A1 | 3/2005 | Hoflehner et al. | |
| 2005/0223385 A1 | 10/2005 | Braun et al. | |
| 2005/0235136 A1 | 10/2005 | Barsotti et al. | |
| 2007/0214342 A1* | 9/2007 | Newburn et al. | ............... 712/216 |

OTHER PUBLICATIONS

Moseley et al., "Shadow Profiling: Hiding Instrumentation Costs with Parallelism", IEEE, 2007.*
Bohra, "System Architectures Based on Functionality Offloading", Jan. 2008, Rutgers Unviersity/New Brunswick, vol. 7008B of Dissertation Abstracts International, pp. 4936, 167 pages.
Chang et al., "Thread Management in the Event Service", IBM TDB V 40, No. 12, Dec. 1997, pp. 163-164.
IBM, "Real Time Data Throughput Display for a Storage I/O/ Driver", IPCOM000073584D, Feb. 2005, pp. 1-3.

* cited by examiner

*Primary Examiner* — Andrew Caldwell
*Assistant Examiner* — Benjamin Geib
(74) *Attorney, Agent, or Firm* — Yee & Associates, P.C.; Libby Z. Toub (57) ABSTRACT

A method and data processing system for managing running of instructions in a program. A processor of the data processing system receives a monitoring instruction of a monitoring unit. The processor determines if at least one secondary thread of a set of secondary threads is available for use as an assist thread. The processor selects the at least one secondary thread from the set of secondary threads to become the assist thread in response to a determination that the at least one secondary thread of the set of secondary threads is available for use as an assist thread. The processor changes profiling of running of instructions in the program from the main thread to the assist thread.

16 Claims, 5 Drawing Sheets

HARDWARE ASSIST THREAD FOR DYNAMIC PERFORMANCE PROFILING

BACKGROUND

1. Field

The present application relates generally to an improved data processing apparatus and method, and more specifically, to mechanisms for selecting a hardware assist thread from a pool of available threads to improve the efficiency of the dynamic profiling of a main thread.

2. Description of the Related Art

Profiling is an investigation of the behavior of a computer program. The behavior is monitored using information gathered during the operation of the program. Profiling is done to determine which sections of a program may be optimized to increase the speed of the program and/or decrease the program's memory requirements. Programs perform profiling to count events such as, but not limited to, cache misses, branch mispredicts, instruction mixes, and other events. Profiling data may indicate how long it takes to process different instructions and how long the program spends in different areas of the program. Profiling data may be used to optimize the program by removing unnecessary instructions or rearranging instructions to process the program more quickly.

In modern processor architectures and configurations, the concept of multi-threaded processing has been introduced. A thread of execution, or simply a "thread", typically results from a fork in the execution of a computer program into two or more concurrently running tasks, such as at a loop where some iterations are performed by one thread and other iterations are performed by one or more other threads, or branch instructions where the various possible branches are executed by different threads.

The implementation of threads and processes differs from one operating system to another, but in most cases, a thread is contained inside a process. Multiple threads can exist within the same process and share resources, such as memory, while different processes may not share these resources. When a program is profiling, the thread of execution must stall while profiling is performed. When a program is profiling multiple times or throughout the program, the thread of execution may be stalled many times.

SUMMARY

According to one embodiment of the present invention, the illustrative embodiments comprise a method for managing the running of instructions in a program. A processor of the data processing system receives a monitoring instruction of a monitoring unit. The processor determines if at least one secondary thread of a set of secondary threads is available for use as an assist thread. The processor selects the at least one secondary thread from the set of secondary threads to become the assist thread in response to a determination that the at least one secondary thread of the set of secondary threads is available for use as an assist thread. The processor changes profiling of running of instructions in the program from the main thread to the assist thread.

In another illustrative embodiment, a data processing system comprises a bus; a storage device connected to the bus, wherein the storage device contains computer usable code; and a processing unit connected to the bus. The processing unit executes the computer usable code to receive a monitoring instruction of a monitoring unit, determine if at least one secondary thread is available for use as an assist thread, select a secondary thread from a set of secondary threads to provide the assist thread in response to a determination that set of secondary threads is available for use as an assist thread; and changing profiling of running of instructions in the program from the main thread to the assist thread.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

On a single processor, multi-threading generally occurs by time-division multiplexing where the processor switches between different threads. Context switching generally happens frequently enough that the user perceives the threads, or tasks, as running at the same time. On a multi-processor or multi-core system, the threads or tasks will generally run at the same time with each processor or core running a particular thread or task.

The different illustrative embodiments recognize and take into account a number of considerations. For example, the different illustrative embodiments recognize and take into account that in known multi-threaded processors, if software needs to off-load a thread's workload to another thread, the original thread must start, or spawn, a physical thread by going through all the steps of context switching, context synchronization, and data transfer from one thread to another thread using the memory. A "context" is the minimal set of data used by the thread that must be stored to allow an interrupt of the thread's execution and a continuation of the thread after handling the interrupt. A "context switch" is the process of storing and restoring the state of a processor so that execution of a thread can be resumed from the same point at which the thread stopped executing, or was interrupted. Context switches are usually computationally intensive and require a certain amount of time for doing the administrative operations of saving and loading registers and memory maps, updating various tables and lists, and other overhead intensive operations.

"Context synchronization" means the operations performed to ensure that the newly started or spawned thread has a context corresponding to the thread from which the workload is being off-loaded so that the workload can continue to be processed as if it were being processed by the original thread. Context synchronization ensures that the newly started or spawned thread has a substantially same context as the original thread. Furthermore, data may need to be transferred for use in the context of the newly started or spawned thread.

Additionally, the different illustrative embodiments recognize and take into account that threads must be placed in a different state so that a new thread may be started or spawned. Thereafter, the threads must be restarted or placed back into an idle state. This increases the overall latency and overhead for off-loading the work onto another thread.

In general this approach for off-loading workloads from one thread to another works fine on completely independent and long program code. However, for short program code, or individual tasks such as prefetching, non-synchronous operations, pre-computation, or the like, on speculative parallelized loops, the latency of starting a new physical thread by software will overshadow the potential gain in performance by off-loading the work onto another thread.

Additionally, the different illustrative embodiments recognize and take into account that processors have built-in support for profiling on a per hardware thread basis. Hardware support includes special purpose registers to configure performance events, count configured events, and interrupt the thread for data collection by software. Software applications interested in profiling may request a program such as an operating system to set up the configuration. Software applications perform profiling to count events such as, but not limited to, cache misses, branch mispredicts, instructions mixes, and other events.

Additionally, the different illustrative embodiments recognize and take into account that during profiling, when one of the registers configured for profiling overflows, an interrupt is signaled by hardware. Delivery of the profiling data to the software application is done by interrupting the hardware thread the data was collected on, and then invoking an interrupt. The interrupt issues instructions to move the data from the thread to memory so that the software application may access the data. The software application for which profiling data is being collected must be interrupted and the interrupt takes up cycles in the processor which the software application may have used to complete more work.

Thus, the different illustrative embodiments provide a method and data processing system for managing running of instructions in a program. A processor of the data processing system receives a monitoring instruction of a monitoring unit. The processor determines if at least one secondary thread of a set of secondary threads is available for use as an assist thread. The processor selects the at least one secondary thread from the set of secondary threads to become the assist thread in response to a determination that the least one secondary thread of the set of secondary threads is available for use as an assist thread. The processor changes profiling of running of instructions in the program from the main thread to the assist thread.

Figure 1:
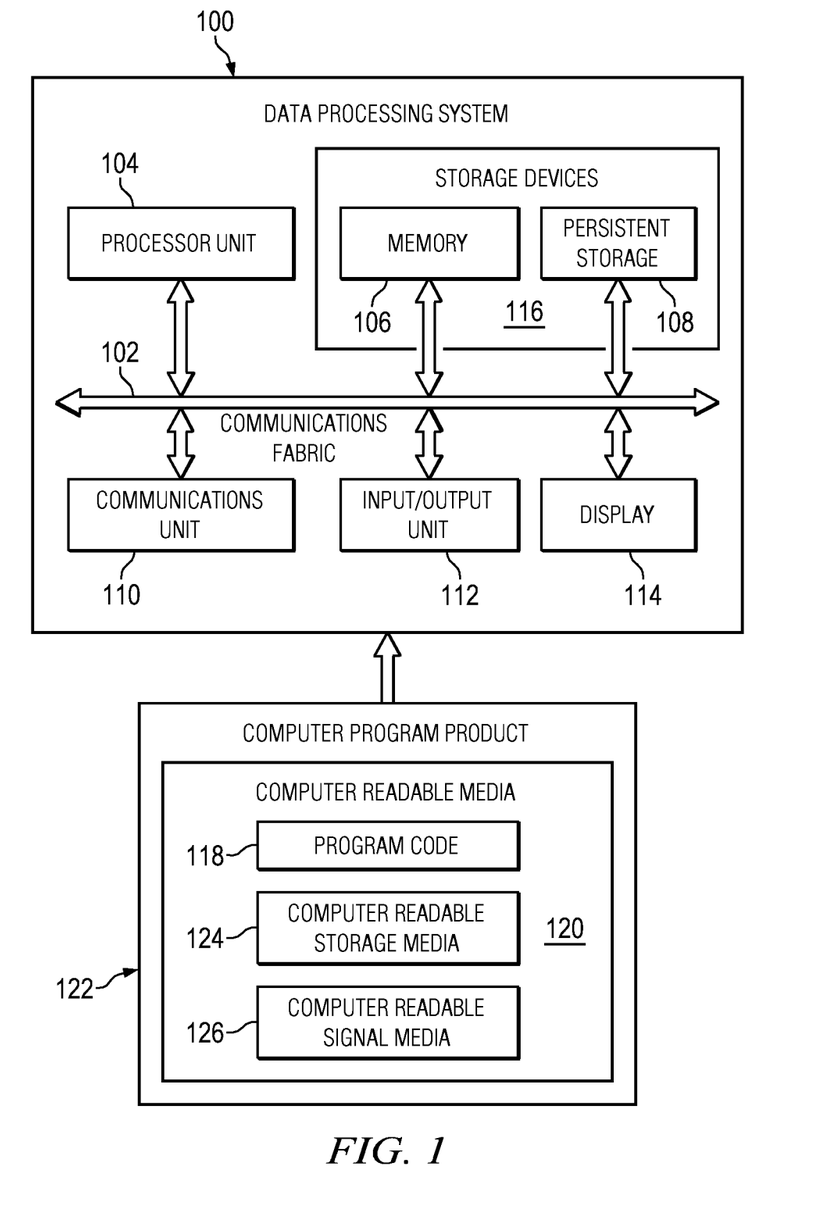
FIG. 1 is an illustration of a data processing system depicted in accordance with an illustrative embodiment.

Turning now to FIG. 1, an illustration of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a number of processors, a multi-processor core, or some other type of processor, depending on the particular implementation. A number, as used herein with reference to an item, means one or more items. Further, processor unit 104 may be implemented using a number of heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms, depending on the particular implementation.

For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communication links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications, and/or programs may be located in storage devices 116, which are in communication with processor unit 104 through communications fabric 102. In these illustrative examples, the instructions are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or computer readable storage media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be computer readable storage media 124 or computer readable signal media 126. Computer readable storage media 124 may include, for example, an optical or magnetic disk that is inserted or placed into a drive or other device that is part of persistent storage 108 for transfer onto a storage device, such as a hard drive, that is part of persistent storage 108. Computer readable storage media 124 also may take the form of a persistent storage, such as a hard drive, a thumb drive, or a flash memory, that is connected to data processing system 100. In some instances, computer readable storage media 124 may not be removable from data processing system 100. In these illustrative examples, computer readable storage media 124 is a non-transitory computer readable storage medium.

Alternatively, program code 118 may be transferred to data processing system 100 using computer readable signal media 126. Computer readable signal media 126 may be, for example, a propagated data signal containing program code 118. For example, computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 118 may be downloaded over a network to persistent storage 108 from another device or data processing system through computer readable signal media 126 for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different advantageous embodiments may be implemented in a data processing system including components in addition to or in place of those illustrated for data processing system 100. Other components shown in FIG. 1 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108, and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106, or a cache, such as found in an interface and memory controller hub that may be present in communications fabric 102.

Figure 2:
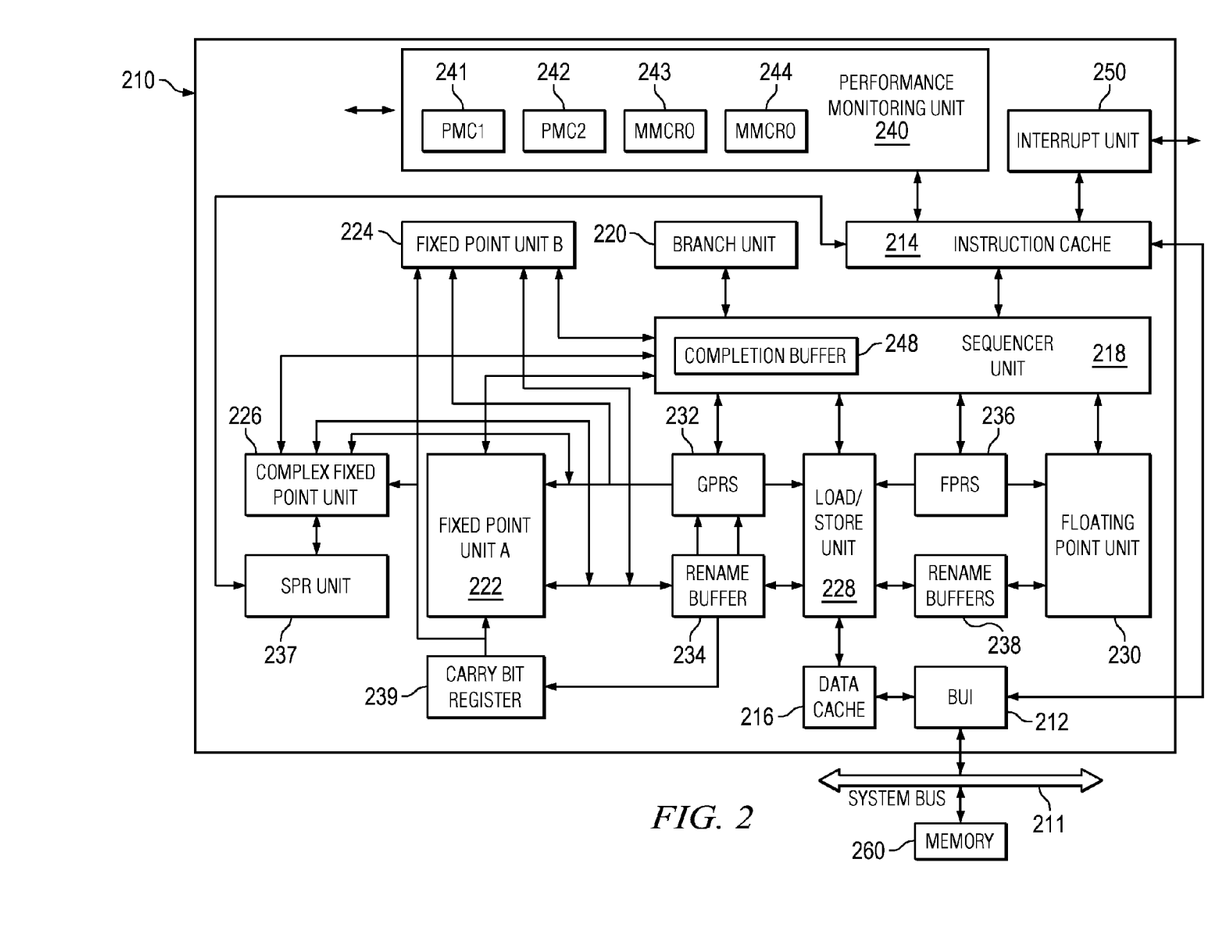
FIG. 2 is a block diagram of a processor system for processing information depicted in accordance with an illustrative embodiment.

Turning next to FIG. 2, a block diagram of a processor system for processing information is depicted in accordance with a preferred embodiment of the present invention. Processor 210 may be implemented as processor 104 in FIG. 1.

In a preferred embodiment, processor 210 is a single integrated circuit superscalar microprocessor. Accordingly, as discussed further herein below, processor 210 includes various units, registers, buffers, memories, and other sections, all of which are formed by integrated circuitry. Also, in the preferred embodiment, processor 210 operates according to reduced instruction set computer ("RISC") techniques. As shown in FIG. 2, system bus 211 is connected to a bus interface unit ("BIU") 212 of processor 210. BIU 212 controls the transfer of information between processor 210 and system bus 211. BIU 212 is connected to an instruction cache 214 and to data cache 216 of processor 210. Instruction cache 214 outputs instructions to sequencer unit 218. In response to such instructions from instruction cache 214, sequencer unit 218 selectively outputs instructions to other execution circuitry of processor 210.

In addition to sequencer unit 218, in the preferred embodiment, the execution circuitry of processor 210 includes multiple execution units, namely a branch unit 220, a fixed-point unit A ("FXUA") 222, a fixed-point unit B ("FXUB") 224, a complex fixed-point unit ("CFXU") 226, a load/store unit ("LSU") 228, and a floating-point unit ("FPU") 230. FXUA 222, FXUB 224, CFXU 226, and LSU 228 input their source operand information from general-purpose architectural registers ("GPRs") 232 and fixed-point rename buffers 234. Moreover, FXUA 222 and FXUB 224 input a "carry bit" from a carry bit ("CA") register 239. FXUA 222, FXUB 224, CFXU 226, and LSU 228 output results (destination operand information) of their operations for storage at selected entries in fixed-point rename buffers 234. Also, CFXU 226 inputs and outputs source operand information and destination operand information to and from special-purpose register processing unit ("SPR unit") 237.

FPU 230 inputs its source operand information from floating-point architectural registers ("FPRs") 236 and floating-point rename buffers 238. FPU 230 outputs results (destination operand information) of its operation for storage at selected entries in floating-point rename buffers 238.

In response to a Load instruction, LSU 228 inputs information from data cache 216 and copies such information to selected ones of rename buffers 234 and 238. If such information is not stored in data cache 216, then data cache 216 inputs (through BIU 212 and system bus 211) such information from a system memory 260 connected to system bus 211. Moreover, data cache 216 is able to output (through BIU 212 and system bus 211) information from data cache 216 to system memory 260 connected to system bus 211. In response to a Store instruction, LSU 228 inputs information from a selected one of GPRs 232 and FPRs 236 and copies such information to data cache 216.

Sequencer unit 218 inputs and outputs information to and from GPRs 232 and FPRs 236. From sequencer unit 218, branch unit 220 inputs instructions and signals indicating a present state of processor 210. In response to such instructions and signals, branch unit 220 outputs (to sequencer unit 218) signals indicating suitable memory addresses storing a sequence of instructions for execution by processor 210. In response to such signals from branch unit 220, sequencer unit 218 inputs the indicated sequence of instructions from instruction cache 214. If one or more of the sequence of instructions is not stored in instruction cache 214, then instruction cache 214 inputs (through BIU 212 and system bus 211) such instructions from system memory 260 connected to system bus 211.

In response to the instructions input from instruction cache 214, sequencer unit 218 selectively dispatches the instructions to selected ones of execution units 220, 222, 224, 226, 228, and 230. Each execution unit executes one or more instructions of a particular class of instructions. For example, FXUA 222 and FXUB 224 execute a first class of fixed-point mathematical operations on source operands, such as addition, subtraction, ANDing, ORing and XORing. CFXU 226 executes a second class of fixed-point operations on source operands, such as fixed-point multiplication and division. FPU 230 executes floating-point operations on source operands, such as floating-point multiplication and division.

As information is stored at a selected one of rename buffers 234, such information is associated with a storage location (e.g. one of GPRs 232 or carry bit (CA) register 242) as specified by the instruction for which the selected rename buffer is allocated. Information stored at a selected one of rename buffers 234 is copied to its associated one of GPRs 232 (or CA register 239) in response to signals from sequencer unit 218. Sequencer unit 218 directs such copying of information stored at a selected one of rename buffers 234 in response to "completing" the instruction that generated the information. Such copying is called "writeback."

As information is stored at a selected one of rename buffers 238, such information is associated with one of FPRs 236. Information stored at a selected one of rename buffers 238 is copied to its associated one of FPRs 236 in response to signals from sequencer unit 218. Sequencer unit 218 directs such copying of information stored at a selected one of rename buffers 238 in response to "completing" the instruction that generated the information.

Processor 210 achieves high performance by processing multiple instructions simultaneously at various ones of execution units 220, 222, 224, 226, 228, and 230. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 218 selectively inputs (from instruction cache 214) one or more instructions from one or more memory addresses storing the sequence of instructions discussed further hereinabove in connection with branch unit 220, and sequencer unit 218. In the decode stage, sequencer unit 218 decodes up to four fetched instructions. In the dispatch stage, sequencer unit 218 selectively dispatches up to four decoded instructions to selected (in response to the decoding in the decode stage) ones of execution units 220, 222, 224, 226, 228, and 230 after reserving rename buffer entries for the dispatched instructions' results (destination operand information). In the dispatch stage, operand information is supplied to the selected execution units for dispatched instructions. Processor 210 dispatches instructions in order of their programmed sequence.

In the execute stage, execution units execute their dispatched instructions and output results (destination operand information) of their operations for storage at selected entries in rename buffers 234 and rename buffers 238 as discussed further hereinabove. In this manner, processor 210 is able to execute instructions out-of-order relative to their programmed sequence. In the completion stage, sequencer unit 218 indicates an instruction is "complete." Processor 210 "completes" instructions in order of their programmed sequence.

In the writeback stage, sequencer 218 directs the copying of information from rename buffers 234 and 238 to GPRs 232 and FPRs 236, respectively. Sequencer unit 218 directs such copying of information stored at a selected rename buffer. Likewise, in the writeback stage of a particular instruction, processor 210 updates its architectural states in response to the particular instruction. Processor 210 processes the respective "writeback" stages of instructions in order of their programmed sequence. Processor 210 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 226) may require more than one cycle. Accordingly, a variable delay may occur between a particular instruction's execution and completion stages in response to the variation in time required for completion of preceding instructions.

Completion buffer 248 is provided within sequencer 218 to track the completion of the multiple instructions which are being executed within the execution units. Upon an indication that an instruction or a group of instructions have been completed successfully, in an application specified sequential order, completion buffer 248 may be utilized to initiate the transfer of the results of those completed instructions to the associated general-purpose registers.

In addition, processor 210 also includes performance monitor unit 240, which is connected to instruction cache 214 as well as other units in processor 210. Operation of processor 210 can be monitored utilizing performance monitor unit 240, which in this illustrative embodiment is a software-accessible mechanism capable of providing detailed information descriptive of the utilization of instruction execution resources and storage control. Although not illustrated in FIG. 2, performance monitor unit 240 is coupled to each functional unit of processor 210 to permit the monitoring of all aspects of the operation of processor 210, including, for example, reconstructing the relationship between events, identifying false triggering, identifying performance bottlenecks, monitoring pipeline stalls, monitoring idle processor cycles, determining dispatch efficiency, determining branch efficiency, determining the performance penalty of misaligned data accesses, identifying the frequency of execution of serialization instructions, identifying inhibited interrupts, and determining performance efficiency. The events of interest also may include, for example, time for instruction decode, execution of instructions, branch events, cache misses, and cache hits.

Performance monitor unit 240 includes an implementation-dependent number (e.g., 2-8) of counters 241-242, labeled PMC1 and PMC2, which are utilized to count occurrences of selected events. Performance monitor unit 240 further includes at least one monitor mode control register (MMCR). In this example, two control registers, MMCRs 243 and 244 are present that specify the function of counters 241-242. Counters 241-242 and MMCRs 243-244 are preferably implemented as SPRs that are accessible for read or write via MFSPR (move from SPR) and MTSPR (move to SPR) instructions executable by CFXU 226. However, in one alternative embodiment, counters 241-242 and MMCRs 243-244 may be implemented simply as addresses in I/O space. In another alternative embodiment, the control registers and counters may be accessed indirectly via an index register. This embodiment is implemented in the IA-64 architecture in processors from Intel Corporation.

The various components within performance monitoring unit 240 may be used to generate data for performance analysis. Depending on the particular implementation, the different components may be used to generate trace data. In other illustrative embodiments, performance unit 240 may provide data for time profiling with support for dynamic address to name resolution.

Additionally, processor 210 also includes interrupt unit 250, which is connected to instruction cache 214. Additionally, although not shown in FIG. 2, interrupt unit 250 is connected to other functional units within processor 210. Interrupt unit 250 may receive signals from other functional units and initiate an action, such as starting an error handling or trap process. In these examples, interrupt unit 250 is employed to generate interrupts and exceptions that may occur during execution of a program.

Figure 3:
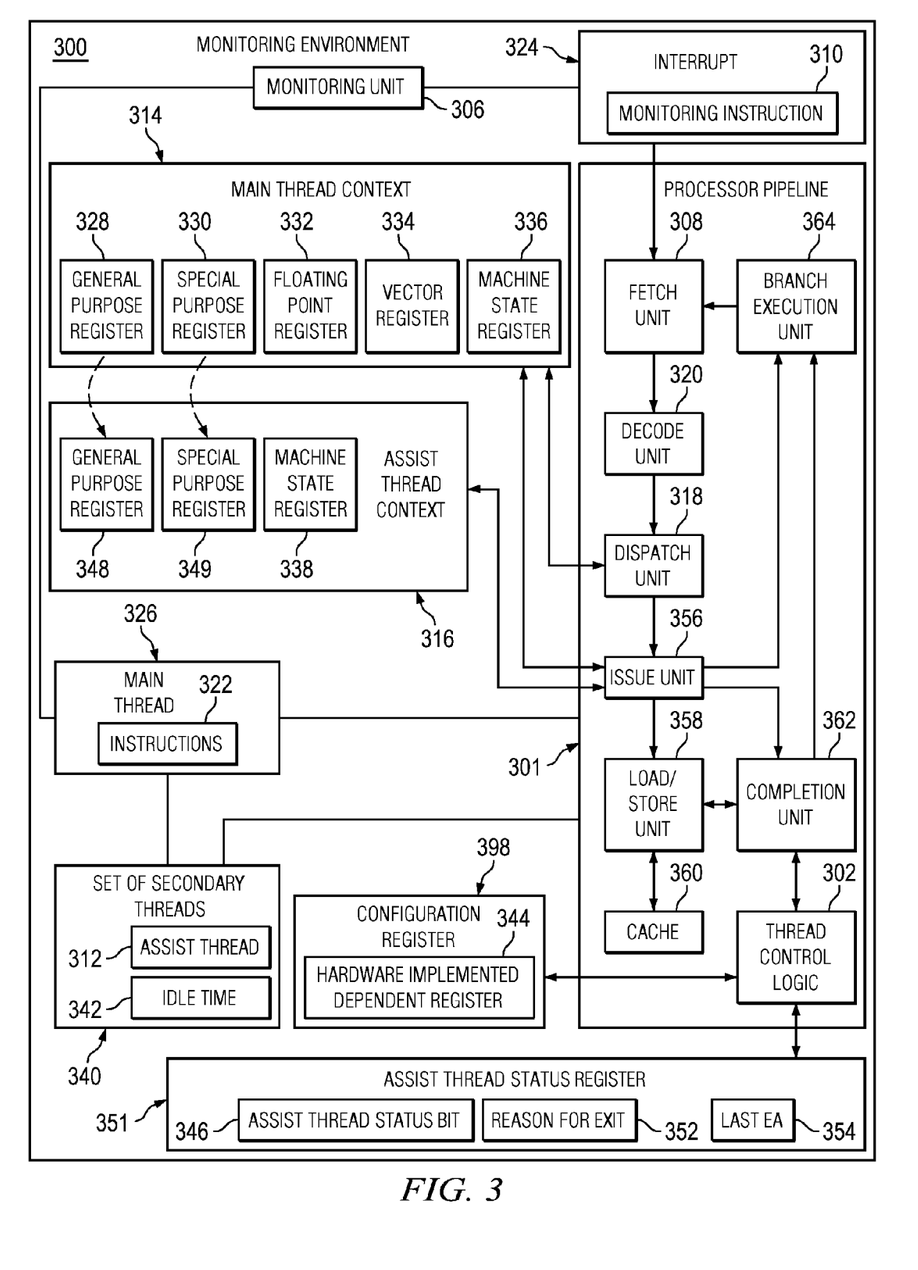
FIG. 3 is a block diagram of a processor pipeline in accordance with an illustrative embodiment.

Turning to FIG. 3, a block diagram of a monitoring environment is illustrated in accordance with an illustrative embodiment. Monitoring environment 300 may be implemented in a processor, such as processor 210 in FIG. 2.

Monitoring environment 300 is an environment that may monitor the performance of a thread of execution. Monitoring environment 300 comprises processor pipeline 301. In addition, as shown in FIG. 3, processor pipeline 301 includes thread control logic 302 that is used to control the overall operation of processor pipeline 301 with regard to assist threads.

With the illustrative embodiments, when interrupt 324 is received in processor pipeline 301 from monitoring unit 306, fetch unit 308 determines and stores the offset of monitoring instruction 310 that assist thread 312 is to start executing, if such assist thread 312 is available. This offset of monitoring instruction 310 for assist thread 312 is referred to as the "target address" of assist thread 312. Fetch unit 308 then waits for the assist thread entry point conditions to be met. Assist thread entry point conditions are met when all of the required registers, for example, general purpose register 328, special purpose register 330, and the like, from main thread context 314 are copied over to assist thread context 316, and the clock of assist thread 312 is enabled. General purpose register 328, special purpose register 330, and other required registers are copied to their equivalent counterparts, such as general purpose register 348 and special purpose register 349. Once these conditions are met, monitoring instruction 310 is provided to dispatch unit 318 of processor pipeline 301 via decode unit 320. Monitoring unit 306 may be one example of one implementation of performance monitoring unit 240 as shown in FIG. 2.

Within dispatch unit 318, all the younger instructions of instructions 322 from main thread 326 are held in dispatch unit 318 until selected general purpose register 328, special purpose register 330, associated with the main thread context 314 are copied over to assist thread context 316. A younger instruction is an instruction fetched from memory after interrupt 324. Interrupt 324 may have associated bits for indicating what register states are to be copied over from main thread context 314 to assist thread context 316.

The associated bits may be set by the compiler according to the types of instructions or operations that are to be performed by assist thread 312. For example, a "copy bit" may be set in interrupt 324 to indicate whether to copy floating point register (FPR) 332 and vector register (VR) 334 states corresponding to main thread 326 over to assist thread context 316.

Main thread context 314 and assist thread context 316 of the processor each may have an associated machine state register (MSR) 336 and 338 which may have various bits to indicate various machine states, including whether assist thread 312 may be spawned at all from a main thread, either via software or the hardware mechanisms of the illustrative embodiments. Machine state register 336, for example, may have an assist thread enable bit. If the enable bit is set by the operating system, assist threads may be spawned by hardware/software. However, if the assist thread enable bit is not set, then assist threads are not available to be spawned from this particular main thread. The spawning of assist threads from main threads may be controlled by the operating system, hypervisor, or other privileged process, setting such machine state register assist thread enable bits for the various main threads. In such a case, if processor pipeline 301 receives interrupt 324 and the assist thread enable bit is not set, then an exception may be thrown which is then handled by an appropriate exception handler of the operating system.

If the assist thread enable bit is set, dispatch unit 318 may make a determination as to whether there are any secondary threads in set of secondary threads 340 available that can be used as assist threads. For example, in a simultaneous multi-threading processor, if the processor is configured to operate in a single thread mode, then x−1 number of threads is available as idle threads that may be used as assist threads. The character "x" may be any integer value indicating the number of simultaneous threads that may be executed by the processor. The mode of operation of the processor would need to be increased at least one level. For example, mode of operation of the processor would need to be increased from a single thread mode to at least a simultaneous multi-threading mode with two threads in order to permit the assist thread to be utilized. Facilities are provided in processor architectures to allow the changing of the simultaneous multi-threading mode that the processor is operating in.

As another example, if the processor is operating in a simultaneous multi-threading mode with two threads and there is only 1 thread running on the processor, and x−1 number of threads are in a sleep state, then transitioning to another simultaneous multi-threading mode is not necessary since the current simultaneous multi-threading mode is not being fully utilized. To the contrary, one of the idle threads is selected and its state is transitioned from an idle state to an active assist thread state. The idle thread selected may be based on idle time 342. Idle time 342 is the period of time that the idle thread is idle. However, if in the simultaneous multi-threading mode with two threads, when both threads are being utilized, then a transition to a higher simultaneous multi-threading mode, for example four threads, would be necessary to spawn additional threads that may be idle and selectable as an assist thread. All the information about how many threads are currently running, the simultaneous multi-threading mode of the processor, how many threads are in a sleep or idle state, and the like, are available in thread control logic 302.

As mentioned above, if there are no available idle threads, then a determination may be made by dispatch unit 318 as to whether the processor may be switched to a different mode of operation to facilitate the spawning of a new thread to operate as an assist thread. For example, the processor may be switched from a single thread mode of operation to a multiple thread mode of operation, or from one multiple thread mode of operation, to two threads for example, to another multiple thread mode of operation, four threads for example. This determination may be made by looking at the setting of a hardware implemented dependent register (HID) bit 344 in a mode configuration register 398 that can be set by the operating system upon system configuration or reconfiguration. If hardware implemented dependent register bit 344 is not set to indicate another mode of operation that the processor can be switched, then from the main thread's point of view, interrupt 324 may be considered a no-op instruction with the exception that assist thread status bit 346 in general purpose register 348 may be set to indicate that the assist thread is not started due to no available thread.

Assist thread status register 351 may be part of the thread control logic 302, and may be provided as part of main thread context 314, or may be separate from thread control logic 302 and/or main thread context 314, but accessible by thread control logic 302. Each assist thread 312 may be represented by an associated assist thread status register 351. Assist thread status register 351 is used to report the status of assist thread 312 to main thread 326. If assist thread 312 does not start, a status bit in the register is set so that the main thread may check it later. In addition, at an exit point of assist thread 312, completion unit 362 stores an indicator of reason for exit 352 of assist thread 312 in assist thread status register 351 along with last effective address (EA) 354 of the last completed instruction of assist thread 312. Assist thread 312 may exit or abort for many different reasons including an abort assist thread (SAP) instruction from assist thread 312 instruction queue or main thread 326 instruction queue, main thread 326 wanting to start a new assist thread, an exception in assist thread 312, a segment lookaside buffer (SLB) update from either main thread 326 or assist thread 312, main thread 326 swapping out, or going into a sleep state, assist thread 312 aborting if a new thread is enabled by software and has a same thread identifier as assist thread 312, or if assist thread 312 tries to perform a memory access. Various identifiers may be provided and may be stored in assist thread status register 351 to indicate which, if any, of these reasons were the cause of an exit or abort of assist thread 312.

If there is no available idle thread to "borrow" to be assist thread 312, and hardware implemented dependent register bit 344 indicates that a mode switch in the processor is possible, then the mode switch may be performed and one or more additional threads may be spawned using software mechanisms. Thereafter, or if there is already an available idle thread available, one of these idle threads may be selected to be used as an assist thread. For example, idle threads may be grouped by the thread control logic 302 into different levels of idleness. The thread control logic 302 may further maintain information on which threads in the idle state have been in the idle state the longest and which have been idle the shortest amount of time. The thread control logic 302 may select an idle thread based on this information by prioritizing the threads according to how long they have been idle and their level of idleness such that an idle thread that has been idle the longest and has a deepest level of idleness is chosen for use as an assist thread since such threads are unlikely to be used again soon by the software.

Dispatch unit 318 may dispatch interrupt 324 to issue unit 356 with an indication of assist thread 312. Issue unit 356 may copy the selected general purpose register 328, special purpose register 330, and other selected main thread 326 registers from main thread context 314 into assist thread context 316. Issue unit 356 may then issue interrupt 324 to load/store unit 358 which load/stores data to/from cache 360. Moreover, load/store unit 358 enforces thread synchronization to ensure that all older stores of main thread 326, for example store instructions fetched prior to interrupt 324, are visible to assist thread 312 once interrupt 324 is in the next to complete stage of processor pipeline 301. The thread synchronization is enforced by load/store unit 358. Load/store unit 358 enforces thread synchronization by performing a virtual synchronization operation. The operation performs cross thread checking to communicate between main thread 326 and assist thread 312. The virtual synchronization operation basically involves blocking all younger instructions of instructions 322 from main thread 326 that come in after interrupt 324 and draining all the outstanding store operations before allowing younger instructions from main thread 326 or instructions from assist thread 312 to come in the load/store pipeline. In this way, the virtual synchronization operation ensures that all the data from the older load and store instructions from main thread 326 is available to the assist thread instructions, thereby maintaining the order of threads.

Issue unit 356 may further issue interrupt 324 to completion unit 362. Completion unit 362 communicates with thread control logic 302. Control logic 302 is responsible for monitoring the status and execution of assist thread 312, selecting an appropriate assist thread from idle threads based on information maintained regarding idle threads as discussed above, switching simultaneous multi-threading modes if necessary, and starting assist thread clocks. Completion unit 362 will determine that thread synchronization performed by load/store unit 358 was completed successfully without an exception being generated and that all selected main thread registers were copied over into assist thread context 316 without errors. To determine if the assist thread entry point conditions and routines have completed successfully, each unit in the processor that owns part of the assist thread entry point routine will send a bit to thread control logic 302 to indicate it is done without error or if an error occurred. Thread control logic 302 may sample all the status bits from all the units before starting assist thread 312. If all of the entry point conditions and routines of assist thread 312 have completed successfully, then completion unit 362 instructs fetch unit 308, via branch execution unit 364, to start fetching instructions from the target address of assist thread 312.

It should be noted that while assist thread 312 is executing via processor pipeline 301, main thread 326 is allowed to continue executing in a multi-threaded manner as well. Thus, both the main thread 326 and the assist thread 312 are executed substantially in parallel and substantially simultaneously. However, the work that would otherwise be done by main thread 326 with regard to the portion of code associated with interrupt 324 is off-loaded to the assist thread. Hence the work of main thread 326 and assist thread 312 are performed in parallel causing the execution of the code to be performed more quickly and more efficiently.

Thus, the illustrative embodiments provide hardware based mechanisms for borrowing existing idle threads to be used as assist threads for a main thread to thereby off-load the work from the main thread and increase the performance of the code. The hardware mechanisms operate more quickly than convention software thread spawning mechanisms with regard to assist threads and furthermore, do not require as many register states to be copied over from the main thread context to the assist thread context.

Figure 4:
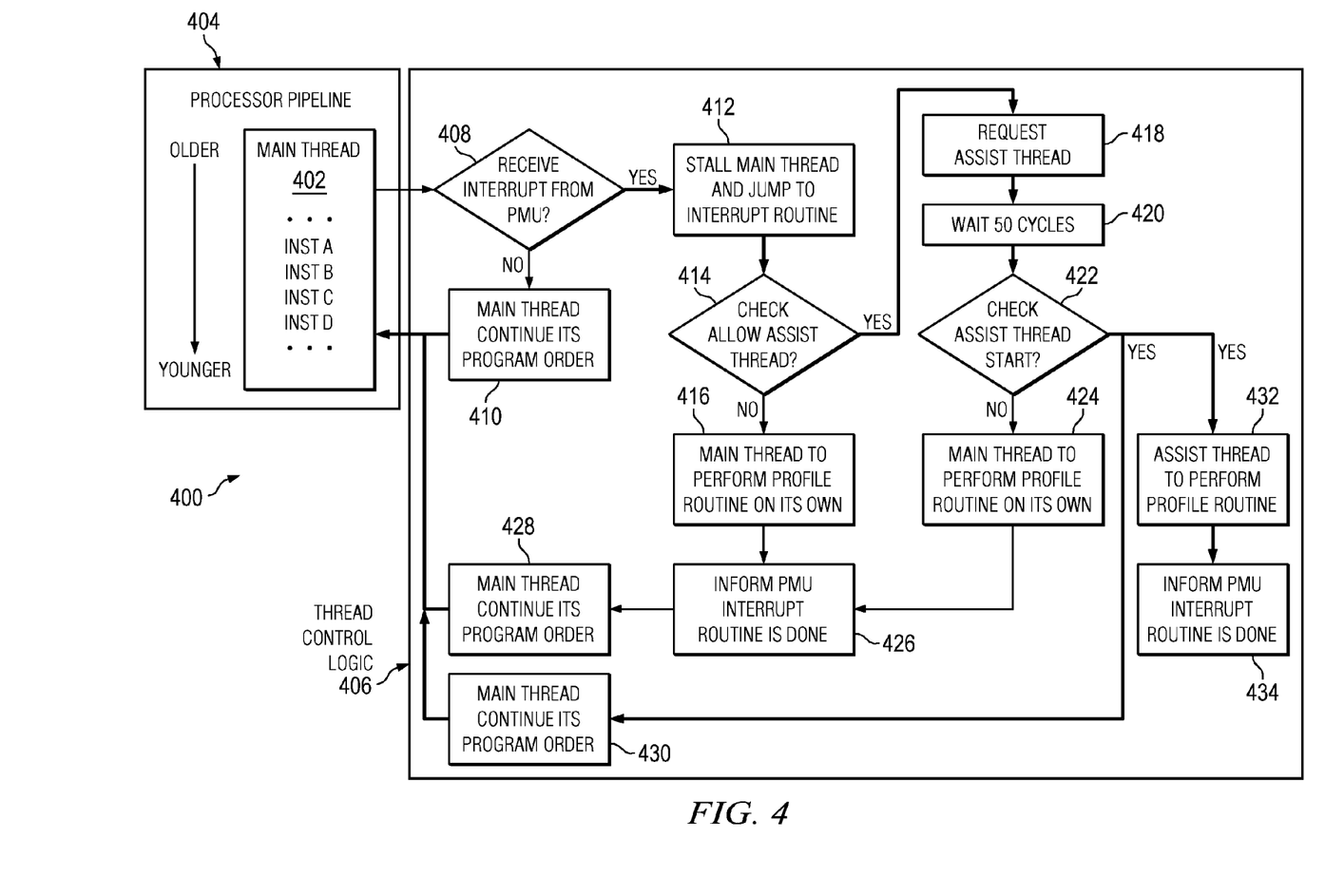
FIG. 4 is a flowchart illustrating an operation of the thread control logic using assist thread to perform profiling in accordance with an illustrative embodiment.

Turning to FIG. 4, a flowchart illustrating an operation of the thread control logic using assist thread to perform profiling in accordance with an illustrative embodiment. While FIG. 4 shows certain operations being performed by the thread control logic, the illustrative embodiments are not limited to such an embodiment. To the contrary, FIG. 4 is only an example of one illustrative embodiment and the operations may be distributed to other elements of the processor, as well as the thread control logic may perform other operations not explicitly shown in FIG. 4. Flowchart 400 may be implemented in a monitoring environment, such as monitoring environment 300 of FIG. 3.

As shown in FIG. 4, main thread 402 of a computer program may be executed in program order from older instructions to younger instructions in processor pipeline 404. As part of main thread 402, an interrupt may be encountered causing thread control logic 406 to operate to control the selection of an existing idle thread as an assist thread for main thread 402. The interrupt may be a monitoring instruction to monitor main thread 402.

A fetch unit and dispatch unit identify whether an interrupt is encountered during the processing of the main thread 410 (step 408). The interrupt may be received from the performance monitoring unit. If the interrupt instruction is not encountered, the operation continues the execution of the main thread in program order (step 410). Otherwise, if the interrupt instruction is encountered, the main thread may be stalled (step 412). A determination is made as to whether there is an available idle thread and/or the processor mode can be switched to a simultaneous multi-threading mode that will permit the spawning of a new idle thread (step 414). Step 414 may be done via communication between the dispatch unit and the thread control logic which stores the thread control information or has access to this thread control information upon which the determination may be made. If there is no available idle thread and the processor mode cannot be set to cause a new idle thread to be spawned, then the main thread executes the monitoring instruction on its own and performs the profiling, thereby causing the main thread to perform the work that would otherwise have been off-loaded to an assist thread (step 416).

If however, either there is an available idle thread or the processor's mode can be modified to allow the spawning of a new idle thread, then an assist thread is requested (step 418). The main thread continues its execution in program order with the instructions that are not off-loaded, instructions that are younger than the interrupt, to the assist thread. The processor waits 50 cycles to determine if the assist thread has started (step 420). In different illustrative embodiments, the process may or may not have step 418. In one or more illustrative embodiments, any number of cycles may be used to wait to determine if the assist thread has begun. In some illustrative embodiments, the processor may not wait at all between checks. The processor then determines if the assist thread has started (step 422).

If the processor determines that the assist thread has not started, the main thread executes the monitoring instruction on its own and performs the profiling, thereby causing the main thread to perform the work that would otherwise have been offloaded to an assist thread (step 424). In step 416 and step 424, if the main thread performs profiling on its own, when the monitoring instruction is complete, the processor informs the performance monitoring unit that the interrupt routine is complete (step 426). Once the performance monitoring unit is informed that the interrupt routine is complete, the main thread continues to execute its instruction in program order (step 428).

If the processor determines that the assist thread has started, the main thread continues to execute its instruction in program order (step 430). Additionally, if the processor determines that the assist thread has started, the assist thread executes the monitoring instructions and performs the profiling (step 432). When the interrupt is complete, the processor informs the performance monitoring unit that the profiling is complete (step 434). Thereafter, the process terminates.

It should be noted that if an assist thread is successfully started, a bit in the assist thread status register may be set to indicate successful start of the assist thread. Alternatively, if the assist thread does not start, then a corresponding bit may also be set in the assist thread status register to indicate that the thread did not start. If the assist thread is exited or aborted, then bits in the assist thread status registers are set to indicate the exit conditions, i.e. the reason for the exit or abort of the assist thread.

Figure 5:
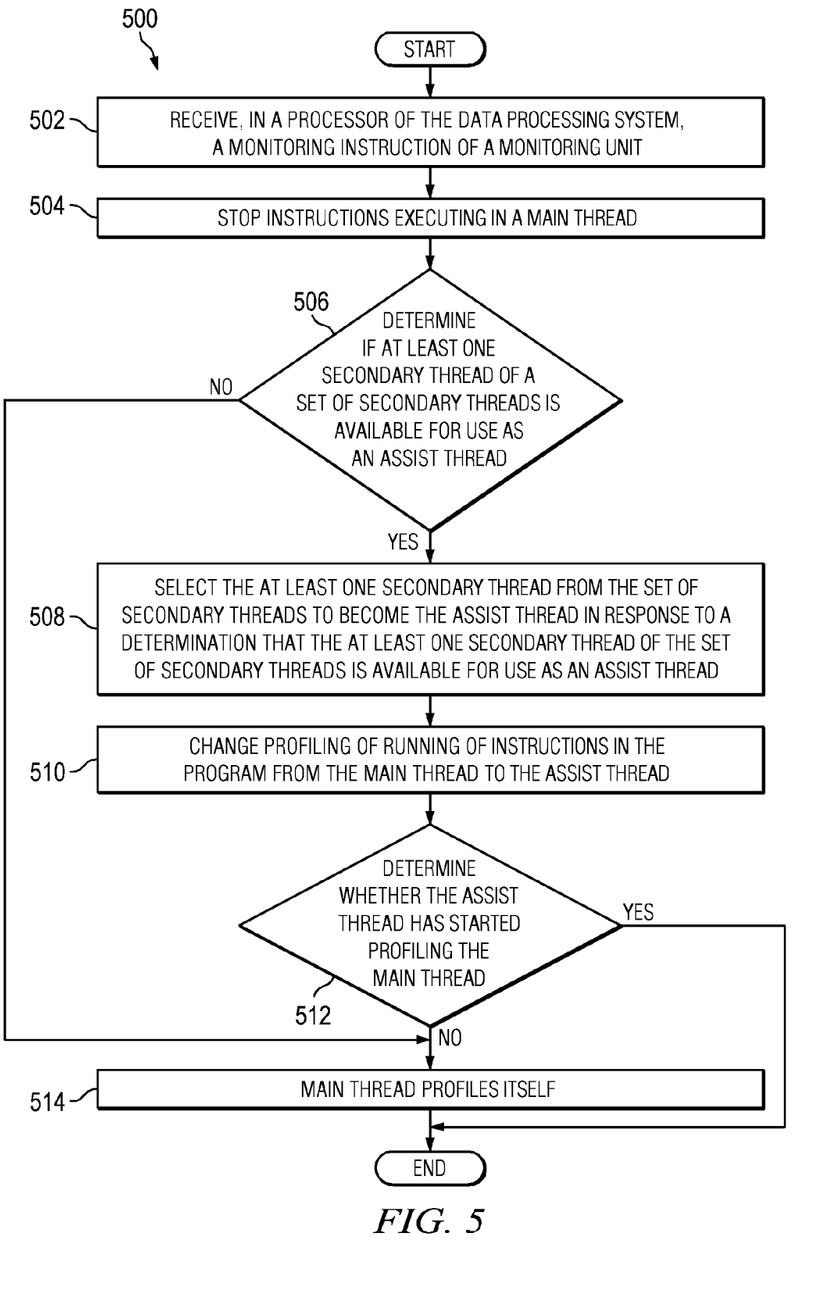
FIG. 5 is a flowchart illustrating a method for managing the running of instructions in a program.

Turning to FIG. 5, a flowchart for managing the running of instructions in a program is illustrated in accordance with an illustrative embodiment. Flowchart 500 may be implemented in a monitoring environment, such as monitoring environment 300 of FIG. 3.

The process begins by receiving, in a processor of the data processing system, a monitoring instruction of a monitoring unit (step 502). The monitoring instruction informs the processor to look for the secondary thread from the set of secondary threads to provide the assist thread. Additionally, the processor stops instructions executing in a main thread in response to receiving a monitoring instruction in a monitoring unit (step 504). Then the processor determines if at least one secondary thread of a set of secondary threads is available for use as an assist thread (step 506).

Step 506 may further comprise determining, by the processor, if a machine state register associated with the main thread indicates that assist threads may be spawned from the main thread, and wherein the assist thread is selected from the set of secondary threads only if the machine state register indicates that an assist thread may be spawned from the main thread.

The process then selects the at least one secondary thread from the set of secondary threads to become the assist thread in response to a determination that the at least one secondary thread of the set of secondary threads is available for use as an assist thread (step 508). Step 508 may further comprise prioritizing the at least one secondary thread according to an amount of time the set of secondary threads have been idle; selecting the secondary thread from the set of secondary threads based on the prioritization of the set of secondary threads; and selecting the secondary thread that has been idle for a longest period of time relative to other secondary threads in the set of secondary threads.

The process then changes profiling of running of instructions in the program from the main thread to the assist thread (step 510). The main thread continues execution of instructions newer than the monitoring instruction after starting the assist thread. Additionally, the processor determines whether the assist thread has started profiling of the running of instructions of the main thread (step 512). The main thread profiles itself in response to a determination that the assist thread has not started profiling the running of instructions of the main thread (step 514).

Thus, the different illustrative embodiments provide a method and data processing system for managing running of instructions in a program. A processor of the data processing system receives a monitoring instruction of a monitoring unit. The processor determines if at least one secondary thread of a set of secondary threads is available for use as an assist thread. The processor selects the at least one secondary thread from the set of secondary threads to become the assist thread in response to a determination that the least one secondary thread of the set of secondary threads is available for use as an assist thread. The processor changes profiling of running of instructions in the program from the main thread to the assist thread.

The different illustrative embodiments provide a process and data processing system to produce an assist thread upon an overflow. An interrupt may execute on the assist thread instead of the main thread greatly reducing overhead processing. The main thread may make forward progress with instructions while the assist thread is moving profiling data to memory. While the assist thread is profiling, profiling done by the main thread is ceased. The main thread can switch back to its original program immediately while its assist thread works on the profiling routine in parallel.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. For example, step 502 and step 504 may happen simultaneously. In different embodiments, step 504 may execute after step 502.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing running of instructions in a program, comprising:
   receiving, in a processor of the data processing system, a monitoring instruction of a monitoring unit,
   determining, by the processor, if at least one secondary thread of a set of secondary threads is available for use as an assist thread;
   responsive to a determination that the at least one secondary thread of the set of secondary threads is available for use as the assist thread, selecting, by the processor, the at least one secondary thread from the set of secondary threads to become the assist thread; and
   changing, by the processor, profiling of running of instructions in the program from the main thread to the assist thread, wherein the profiling of running the instructions is selected from profiling events consisting of cache misses, branch mispredicts, instruction mixes, and combinations thereof.

2. The method of claim 1 further comprising:
   responsive to receiving the monitoring instruction of the monitoring unit, stopping, by the processor, instructions executing in the main thread.

3. The method of claim 2, wherein the main thread continues execution of instructions newer than the monitoring instruction after starting the assist thread.

4. The method of claim 2 further comprising:
   determining, by the processor, whether the assist thread has started profiling the main thread; and
   responsive to a determination that the assist thread has not started profiling the main thread, profiling the main thread with the main thread.

5. The method of claim 1, wherein the monitoring instruction informs the processor to look for the secondary thread from the set of secondary threads to provide the assist thread.

6. The method of claim 1, wherein determining if the set of secondary threads is available for use as the assist thread further comprises:
   determining, by the processor, if a machine state register associated with the main thread indicates that assist threads may be spawned from the main thread, and wherein the assist thread is selected from the set of secondary threads only if the machine state register indicates that the assist thread may be spawned from the main thread.

7. The method of claim 1, wherein selecting the secondary thread from the set of secondary threads to be the assist thread comprises:
   prioritizing the at least one secondary thread according to an amount of time the set of secondary threads have been idle; and
   selecting the secondary thread from the set of secondary threads based on the prioritization of the set of secondary threads.

8. The method of claim 7, wherein selecting the secondary thread from the set of secondary threads comprises:
   selecting the secondary thread that has been idle for a longest period of time relative to other secondary threads in the set of secondary threads.

9. A data processing system comprising:
   a bus;
   a storage device connected to the bus, wherein the storage device contains computer usable code; and
   a processing unit connected to the bus, wherein the processing unit executes the computer usable code to receive a monitoring instruction of a monitoring unit, determine if at least one secondary thread of a set of secondary threads is available for use as an assist thread, select the at least one secondary thread from the set of secondary threads to become the assist thread in response to a determination that the at least one secondary thread of the set of secondary threads is available for use as the assist thread; and changing profiling of running of instructions in the program from the main thread to the assist thread, wherein the profiling of running the instructions is selected from profiling events consisting of cache misses, branch mispredicts, instruction mixes, and combinations thereof.

10. The data processing system of claim 9, wherein the processing unit further executes the computer usable code to stop instructions executing in the main thread in response to receiving the monitoring instruction of the monitoring unit.

11. The data processing system of claim 10, wherein the main thread continues execution of instructions newer than the monitoring instruction after starting the assist thread.

12. The data processing system of claim 10, wherein the processing unit further executes the computer usable code to determine whether the assist thread has started profiling the main thread and profile the main thread with the main thread in response to a determination that the assist thread has not started profiling the main thread.

13. The data processing system of claim 9, wherein the monitoring instruction informs the processor to look for the secondary thread from the set of secondary threads to provide the assist thread.

14. The data processing system of claim 9, wherein the processing unit executing the computer usable code to determine if the set of secondary threads is available for use as the assist thread further comprises the processing unit executing the computer usable code to:
   determine if a machine state register associated with the main thread indicates that assist threads may be spawned from the main thread, and wherein the assist thread is selected from the set of secondary threads only if the machine state register indicates that the assist thread may be spawned from the main thread.

15. The data processing system of claim 9, wherein the processing unit executing the computer usable code to select the secondary thread from the set of secondary threads to be the assist thread further comprises the processing unit executing the computer usable code to:
   prioritize the set of secondary threads according to an amount of time the set of secondary threads have been idle; and
   select the secondary thread from the set of secondary threads based on the prioritization of the set of secondary threads.

16. The data processing system of claim 15, wherein the processing unit executing the computer usable code to select the secondary thread from the set of secondary threads to be the assist thread further comprises the processing unit executing the computer usable code to:
   select the secondary thread that has been idle for a longest period of time relative to other secondary threads in the set of secondary threads.

* * * * *